United States Patent [19]

Lee

[11] Patent Number: 5,159,545
[45] Date of Patent: Oct. 27, 1992

[54] UNIVERSAL ADAPTER

[76] Inventor: Anthony Lee, c/o Hung Hsing Patent Service Center, P.O. Box 55-1670, Taipei (10477), Taiwan

[21] Appl. No.: 761,167

[22] Filed: Sep. 9, 1991

[51] Int. Cl.⁵ .............................................. H02M 1/00
[52] U.S. Cl. .................................. 363/146; 439/173
[58] Field of Search ................ 363/146; 439/166, 169, 439/170, 171, 172, 173, 217, 222

[56] References Cited

U.S. PATENT DOCUMENTS 4,543,624  9/1985  Rumble ................................ 363/146

Primary Examiner—Emanuel T. Voeltz

[57] ABSTRACT

A universal adapter includes a casing, a plurality of plugs formed on one side of the casing having different-shaped plug pins adapted to be plugged in different sockets of multiple nations around the world, a converter selected from a transformer, a rectifier or both mounted in the casing for transforming and/or rectifying an input power, a selector switch rotatably mounted in the casing for outputting a converted power through the converter or outputting a power without being converted, and an output socket formed on the other side of the casing adapted to be connected with a plug of an electrical appliance or equipment carried or owned by a user for a convenient universal electrical connection, especially better for travelling purpose.

5 Claims, 4 Drawing Sheets

UNIVERSAL ADAPTER

BACKGROUND OF THE INVENTION

Whenever travelling around the world, if someone carries a 110 volts hair dryer provided with a plug of two flat pins, which is popularly used in USA, Canada, Japan, and Taiwan, the hair dryer will then be inoperative in Europe or Middle East area wherein a power supply of 220 volts and two or three round holes are provided in a wall socket, because of an impossible electrical connection between the dryer plug and the socket of power supply.

It is therefore expected to invent a universal adapter which can be used worldwide for an electrical connection between a plug of an electric appliance with any power-supply socket around the world.

SUMMARY OF THE INVENTION

The object of the present invention is to provide a universal adapter including a casing, a plurality of plugs formed on one side of the casing having different-shaped plug pins adapted to be plugged in different sockets of multiple nations around the world, a converter selected from a transformer, a rectifier or both mounted in the casing for transforming and/or rectifying an input power, a selector switch rotatably mounted in the casing for outputting a converted power through the converter or outputting a power without being converted, and an output socket formed on the other side of the casing adapted to be connected with a plug of an electrical appliance or equipment carried or owned by a user for a convenient universal electrical connection, especially better for travelling purpose.

DETAILED DESCRIPTION

Figure 1:
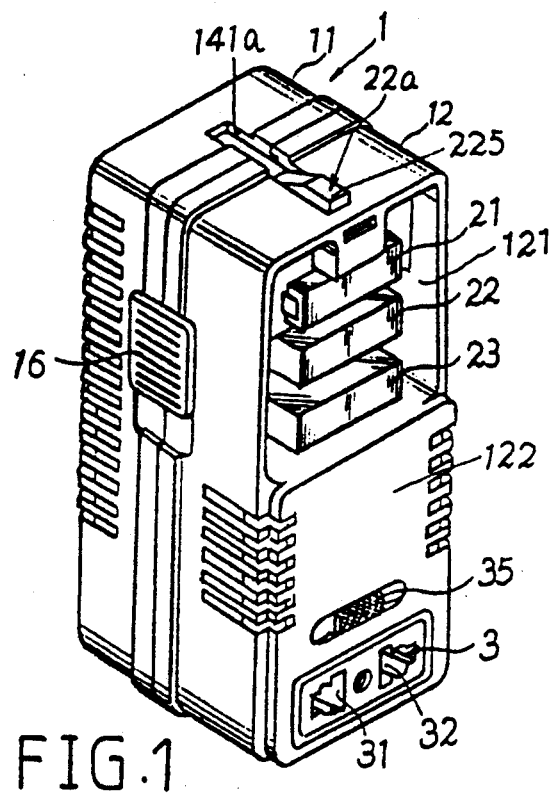
FIG. 1 is a perspective view of the present invention.

As shown in FIGS. 1-5, the present invention comprises: a casing 1, an input plug means 2, an output socket means 3, an inner conducting means 4, a converter 5, and a selector switch means 6.

The casing 1 includes: a front cover 11; a rear cover 12 combined with the front cover 11 by a plurality of screws or rivets 10; a first groove 13, a second groove 14, and a third groove 15 transversely juxtapositionally formed in an upper portion of the casing 1; an uppermost groove 141a transversely formed in an uppermost portion of the casing 1 above the first groove 13; a pair of locking members 16 respectively slidably held in two slots 17 formed in two opposite side portions of the casing 1; a middle chamber 18 formed in a middle portion of the casing 1 below the third groove 15; and a lower chamber 19 formed in a lower portion of the casing 1 below the middle chamber 18.

The input plug means 2 includes: a first plug 21 slidably engageable with the first groove 13 formed in the casing 1 having a pair of first plug pins 211 generally formed as round pins operatively protruding frontwardly adapted for plugging in two round holes (not shown) of a wall socket such as in European or Middle East states of 220/240 volts of municipal power supply, a first block member 212 formed on a rear portion of the first plug 21 made of plastic or electrical insulative material operatively depressed by a user's finger to protrude the first plug pins 211 frontwardly to be limited by two limiting extensions 111a formed on a front plate 111 of the front cover 11 and disposed at two opposite end portions of the first groove 13, two first metallic protrusions 213 disposed on two opposite side portions of the first block member 212 electrically conducting the two first pins 211 and operatively contacting a first and a second conducting plates 41, 42 of the inner conducting means 4 embedded in two opposite end portions in the front cover 11 of the casing 1, and two wedge snap members 214 protruding frontwardly from the first block member 212 and formed in between the two first plug pins 211 to be expandibly retained on the front plate 111 beyond the first groove 13 when depressing the first plug 21 frontwardly for plugging the first plug 21 in a power-supply wall socket; a second plug 22 in cooperation with a grounding plug pin 22a; and a third plug 23.

The second plug 22 includes: a pair of second plug pins 221 generally formed as rectangular pins and a second block member 222 formed on a rear portion of the second plug 22 made of insulative material slidably held in the second groove 14 in casing 1 operatively depressed to protrude the second plug pins 221 frontwardly through two pin holes 14a formed in the front plate 111 of the front cover 11 to allow the second block member 222 to be limited by the front plate 111, two second metallic protrusions 223 disposed on two opposite side portions of the second block member 222 electrically conducting the two second pins 221 and operatively contacting the first and second conducting plates 41, 42 of the inner conducting means 4, two side extensions 224 formed on two opposite side portions of the second plug 22 operatively limited by a stopper protrusion 161 of a locking member 16 slidably held in a vertical slot 17 formed in each side portion of the casing 1 for stably extending the second pins 221 frontwardly for electrical plugging operation, and a grounding plug pin 22a which is made of electrical insulative material and made as a rectangular shape slidably held in the uppermost groove 141a in the casing 1 in cooperation with the two second plug pins 221 to form triple pins adapted to be plugged in triple rectangular holes of a wall socket such as in England, Africa, Singapore, Hong Kong, etc.

Figure 2:
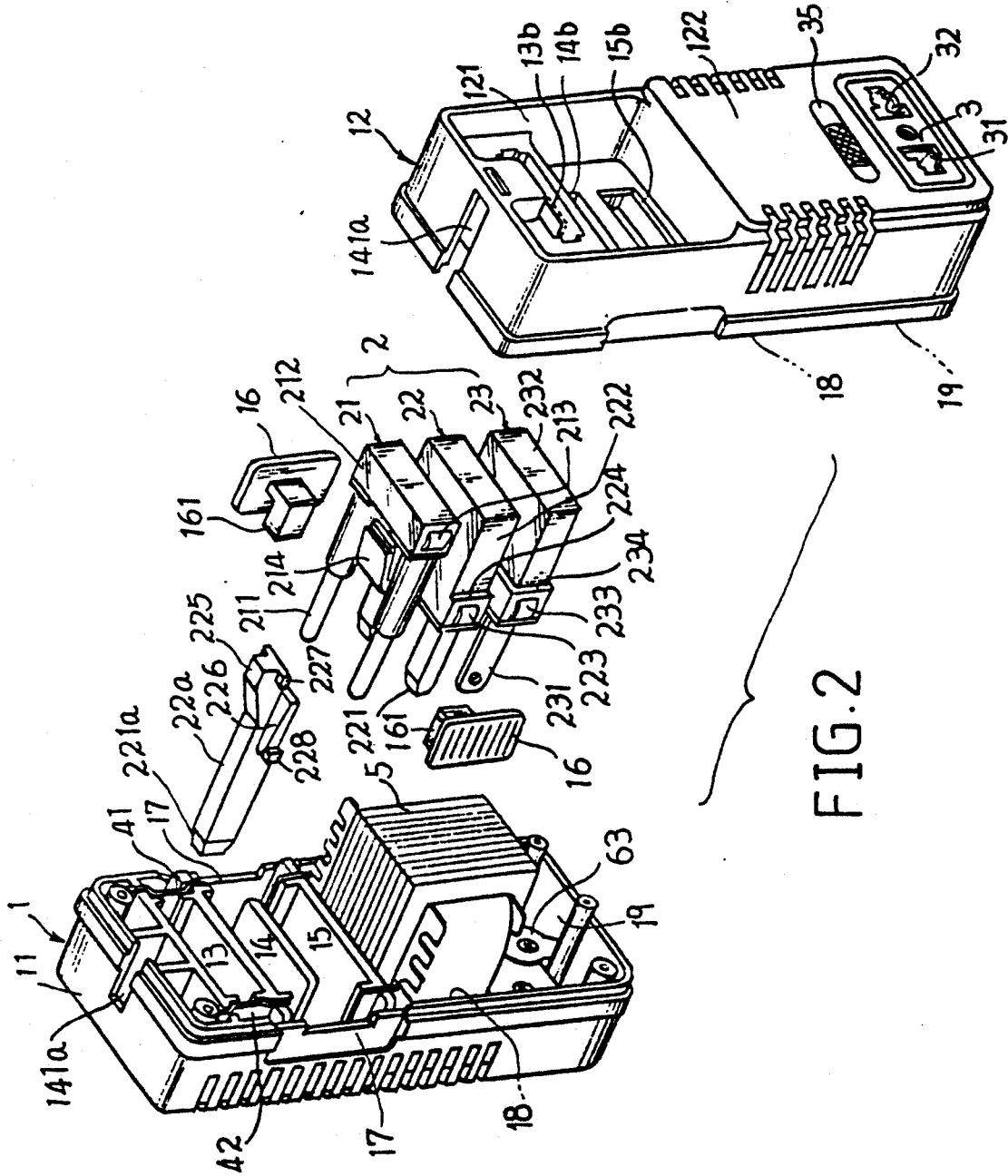
FIG. 2 is an exploded view of the present invention.
Figure 3:
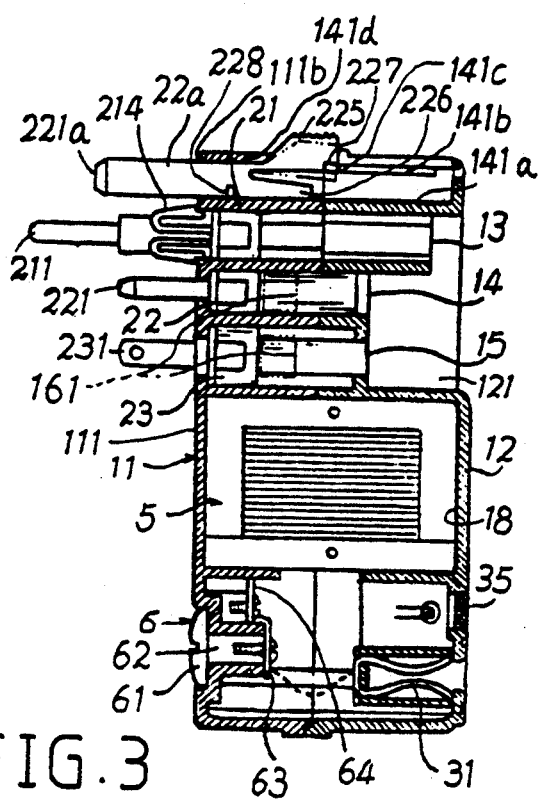
FIG. 3 is a side-view sectional drawing of the present invention.

The grounding plug pin 22a as shown in FIGS. 2, 3 includes: a rectangular-shaped pin 221a protruding frontwardly through a grounding pin hole 111b formed in the front plate 111, a push-button portion 225 formed on an upper rear portion of the grounding pin 22a slid in an upper slot 141d formed in an upper plate of the casing 1, a spring portion 226 formed on a lower portion of the grounding plug pin 22a normally urging the push-button portion 225 upwardly to allow two side lugs 227 disposed on two opposite side portions of the push-button portion 225 to be slidably engageable with two guiding rails 141b formed in the upper plate of the casing 1 projectively disposed on two opposite sides of the upper slot 141d for protruding the rectangular-shaped pin 221a frontwardly until the two lugs 227 being rearwardly retained by two front end portions 141c of the two rails 141b, and two front stoppers 228 formed on a middle portion of the grounding pin 22a to be frontwardly limited by the front plate 111 of the casing 1.

The third plug 23 slidably engageable with the third groove 15 in the casing 1 includes: a pair of third plug pins 231 generally formed as flat blades or pins operatively protruding frontwardly adapted to be plugged in two flat holes in a wall socket such as in USA, Canada, Japan, and Taiwan, a third block member 232 formed on a rear portion of the third plug 23 made of insulative material operatively protruded frontwardly through two pin holes 15a formed in the front plate 111, two third metallic protrusions 233 disposed on two opposite side portions of the third block member 232 electrically conducting the two third pins 231 and operatively contacting the two conducting plates 41, 42 of the inner conducting means 4, and a circumferential extension 234 circumferentially formed on the third block member 232 operatively limited by a stopper protrusion 161 of a locking member 16 slidably held in the casing 1 for stably extending the third pins 231 frontwardly for power connection.

Figure 1A:
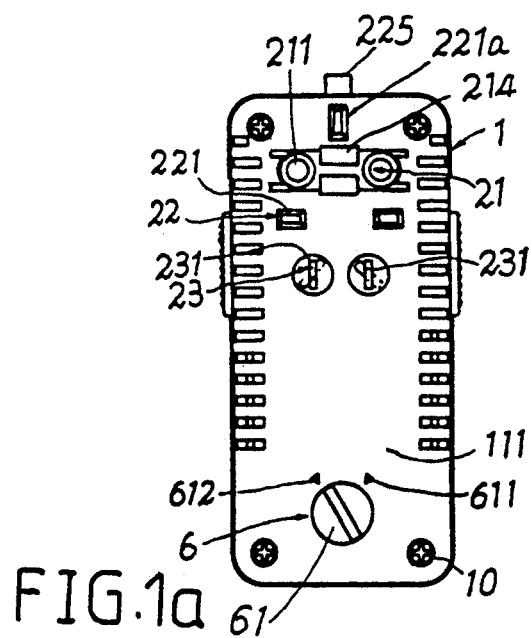
FIG. 1a is a front view illustration of the present invention.

Each third plug pin 231 of the third plug 23 is rotatably mounted in the third block member 232 as shown in FIG. 1a so that two third plug pins 231 may be angularly rotated to form two inclined pins adapted to be plugged in wall sockets such as in Australia and New Zealand.

Figure 4:
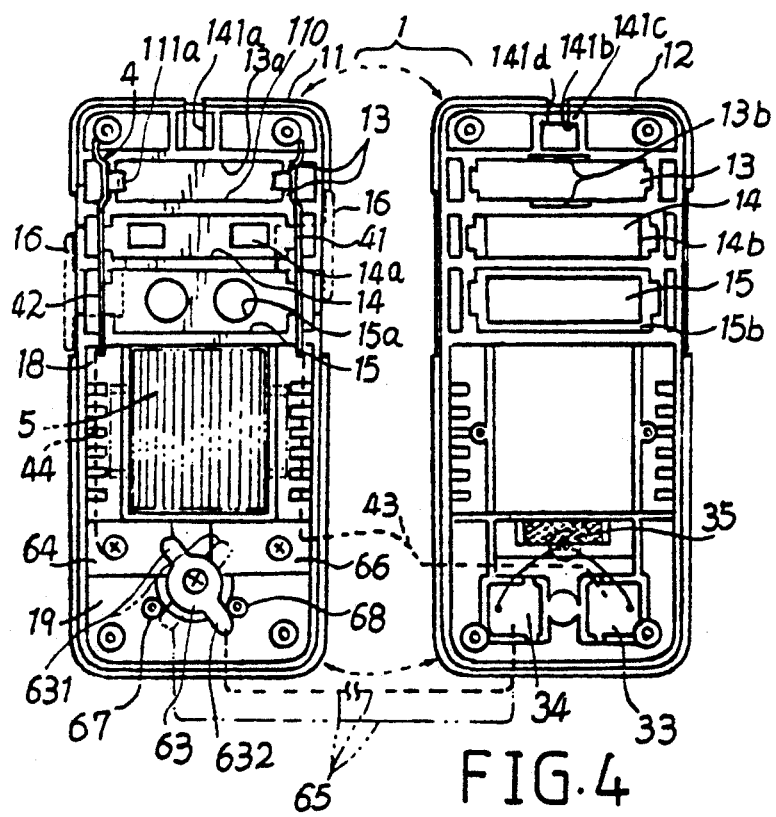
FIG. 4 shows two covers of a casing of the present invention when dismantled.

For a rearward withdrawal of the plug pins 211, 221, 231 of the plugs 21, 22, 23, the wedge snap members 214 of first plug 21 will be rearwardly stopped against two recesses 13b formed in the rear cover 12 as shown in FIGS. 2, 4; the side extension 224 of the second plug 22 will be rearwardly stopped against two rear extensions 14b formed on the rear cover; and the circumferential extension 234 of the third plug 23 will be rearwardly retarded on two rear extensions 15b formed on the rear cover 12. An upper recess 121 is recessed in a rear upper portion of the rear cover 12 for a convenient depression of the plugs by a user's fingers, in comparison with a rear flat surface 122 of the rear cover 12.

The output socket means 3 includes: a first socket 31 formed in the rear cover 12 having a first clip 33 formed in a lower chamber 19 of the casing adapted for electrically connecting a first pin of a plug of an electric appliance for outputing electrical power thereto, a second socket 32 formed in the rear cover 12 having a second clip 34 formed in the lower chamber 19 of the casing 1 for connecting a second pin of the electric appliance plug, both clips 33, 34 respectively electrically connecting a first pole and a second pole of municipal power source, and an indicator lamp 35 adjacent to the two sockets 31, 32 for indicating a normal power supply from the municipal power source through the input plug means 2 and the inner conducting means 4.

The inner conducting means 4 further includes a first and a second conducting wires 43, 44 respectively connected with the two conducting plates 41, 42 electrically connected with two poles of an input power source from the plug means 2 having the first wire 43 connected with the first clip 33.

The selector switch means 6 includes: a selecting knob 61 formed on the front plate 111 and secured with a spindle 62 which may be a bolt rotatably mounted in a lower portion of the casing 1, a conducting lever 63 secured with the spindle 62 having an upper lever portion 631 selectively contacting a converter-bypassed contactor 64 electrically connected with the second conducting wire 44 of the inner conducting means 4 or contacting a converter-passed contactor 66 connected with an output of the converter 5 which is electrically connected with municipal power source through the input plug means 2 and two wires 43, 44 of the inner conducting means 4 for stepping down or up an input power voltage for outputing electric power through the converter-passed contactor 66, and having a lower lever portion 632 connected with an output conducting wire 65 connected to the second clip 34 of the second socket 32 of output socket means 3, and two markings 611, 612 formed on the front plate 111 respectively corresponding to the converter-bypassed contactor 64 and the converter-passed contactor 66 for showing "without being converted" (611) and "through converter" (612) respectively.

In using the present invention, for instance if the user carries an electric appliance (220 volts) to visit Middle East area, he may depress the first plug 21 frontwardly to connect a municipal utility power source and plug his electric appliance plug into the sockets 31, 32 for powering the electric appliance by rotating the selecting knob 61 to the marking 611 indicating "without being converted".

Figure 5:
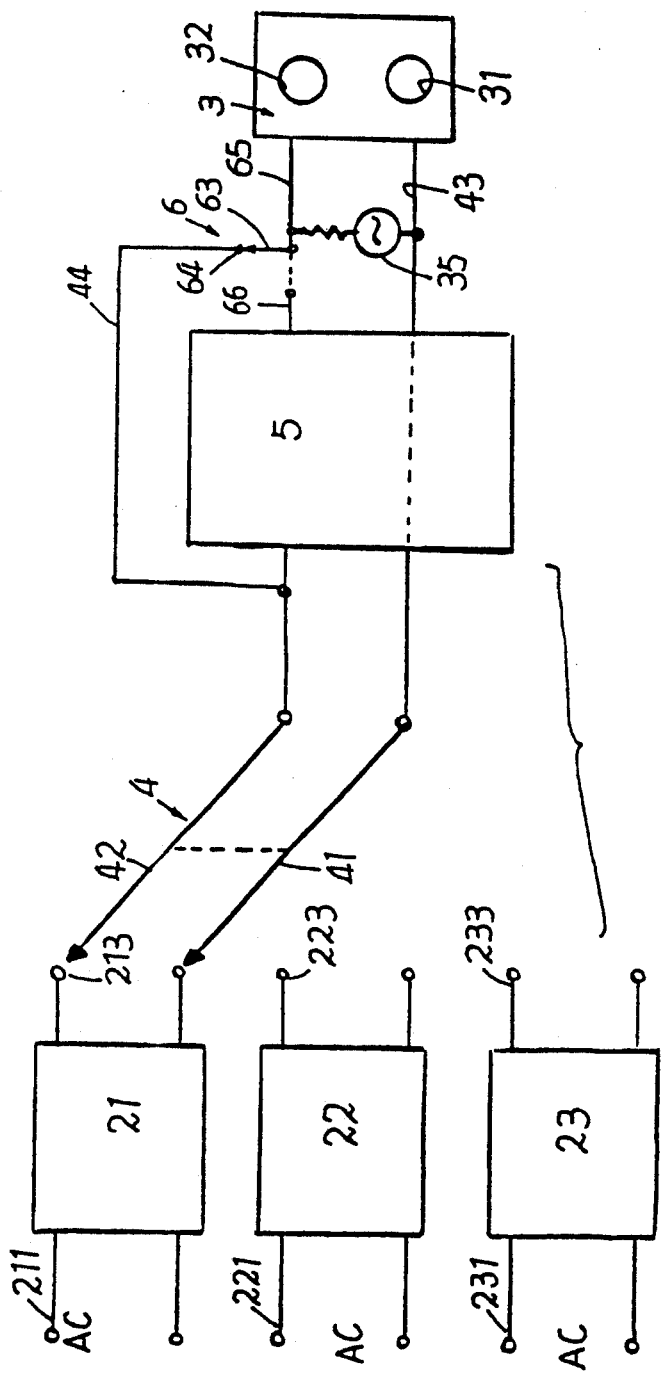
FIG. 5 is a circuit diagram of the present invention.

Comparatively, if a voltage of his electric appliance is 110 volts, for instance, he may rotate the button 61 to be "through converter" 612, a first pole of the utility power source is connected to the first clip 33 of first socket 31 through the first conducting plate 41, first conducting wire 43; and a second pole of the power source is connected to the second slip 34 of the second socket 32 through the second conducting plate 42, the second conducting wire 44 input into the converter 5 which may be a transformer for stepping down the voltage from 220 V to 110 V as shown in FIGS. 5 and 4, and through contactor 66, and output wire 65 by rotating the knob 61 for electrically connecting the contactor 66 with the conducting lever 63 and the output wire 65 secured to the lever 63. Therefore, a step-down voltage (110 V) of power supply can then be used by plugging the appliance plug pins into the two sockets 31, 32.

The converter 5 may be selected from a transformer for stepping down or up an input voltage of a power source, a rectifier for converting an input alternative current to a direct current, or both a transformer and a rectifier combined together.

When withdrawing the first plug pins 211 from its extended state, the two wedge snap members 214 should be squeezed for retracting the snap members 214 and the first plug 21 inwardly in the first groove 13 of the casing 1. For retracting the second or third plug pins 221, 231, the locking members 16 slidably held in two opposite sides of the casing 1 may be slid to release the stopper protrusions 161 without retarding the extensions 224, 234, allowing a free retraction movement of either of the plugs 22, 23.

The sockets 31, 32 should be formed to allow an insertion of either a round plug pin or a flat blade pin into the sockets 31, 32. The push-button portion 225 as shown in FIG. 3 can be depressed downwardly to retract the grounding pin 22a when retracting the second plug 22. Two limiting stoppers 67, 68 are formed in the lower chamber 19 for limiting a rotating movement of the conducting lever 63.

I claim:

1. A universal adapter comprising:
a casing comprised of a front cover and a rear cover;

an input plug means having a plurality of plugs with different-shaped plug pins respectively slidably held in a plurality of grooves transversely juxtapositionally formed in an upper portion of said casing, each said plug operatively protruded frontwardly from said front cover of said casing to be plugged in a wall socket of a municipal utility power supply source;

an output socket means having two sockets formed in said rear cover provided with two clips formed in a lower portion of said casing to be connected with two output plug pins of a user's electric appliance;

an inner conducting means having two conducting plates respectively embedded in two opposite side portions in said casing respectively connecting two poles of the municipal power source through any two plug pins of one said plug of said input plug means having a conducting wire connected to a first clip of said output socket means;

a converter stored in a middle portion of said casing selected from a transformer for stepping down or up a voltage of an input power source and a rectifier for rectifying an input power; and a selector switch means including a selecting knob rotatably mounted in a lower portion of said casing having a conducting lever secured with said selecting knob for selectively connecting a second clip of said output socket means through said converter or without being through said converter;

said input plug means including: a first plug slidably engageable with a first groove formed in the casing having a pair of first plug pins generally formed as round pins operatively protruding frontwardly adapted for plugging in two round holes of a wall socket of a municipal power supply, a first block member formed on a rear portion of the first plug made of electrical insulative material operatively depressed by a user's finger to protrude the first plug pins frontwardly to be limited by two limiting extensions formed on a front plate of the front cover and disposed at two opposite end portions of the first groove, two first metallic protrusions disposed on two opposite side portions of the first block member electrically conducting the two first pins and operatively contacting a first and a second conducting plates of the inner conducting means embedded in two opposite end portions in the front cover of the casing, and two wedge snap members protruding frontwardly from the first block member and formed in between the two first plug pins to be expandibly retained on the front plate beyond the first groove when depressing the first plug frontwardly for plugging the first plug in a wall socket; a second plug including: a pair of second plug pins generally formed as rectangular pins and a second block member formed on a rear portion of the second plug made of insulative material slidably held in a second groove in said casing operatively depressed to protrude the second plug pins frontwardly through two pin holes formed in the front plate of the front cover to allow the second block member to be limited by the front plate, two second metallic protrusions disposed on two opposite side portions of the second block member electrically conducting the two second pins and operatively contacting the first and second conducting plates of the inner conducting means, two side extensions formed on two opposite side portions of the second plug operatively limited by a stopper protrusion of a locking member slidably held in a vertical slot formed in a side portion of the casing for stably extending the second pins frontwardly for electrical plugging operation, and a grounding plug pin which is made of electrical insulative material and made as a rectangular shape slidably held in an uppermost groove formed in the casing in cooperation with the two second plug pins to form triple pins adapted to be plugged in triple rectangular holes of a wall socket; and a third plug slidably engageable with a third groove formed in the casing including: a pair of third plug pins generally formed as flat blades operatively protruding frontwardly adapted to be plugged in two flat holes in a wall socket, a third block member formed on a rear portion of the third plug made of insulative material operatively protruded frontwardly through two pin holes formed in the front plate, two third metallic protrusions disposed on two opposite side portions of the third block member electrically conducting the two third pins and operatively contacting the two conducting plates of the inner conducting means, and a circumferential extension circumferentially formed on the third block member operatively limited by a stopper protrusion of a locking member slidably held in the casing for stably extending the third pins frontwardly for power connection.

2. A universal adapter according to claim 1, wherein said grounding plug pin includes: a rectangular-shaped pin protruding frontwardly through a grounding pin hole formed in the front plate, a push-button portion formed on an upper rear portion of the grounding pin slid in an upper slot formed in an upper plate of the casing, a spring portion formed on a lower portion of the grounding plug pin normally urging the push-button portion upwardly to allow two side lugs disposed on two opposite side portions of the push-button portion to be slidably engageable with two guiding rails formed in the upper plate of the casing projectively disposed on two opposite sides of the upper slot for protruding the rectangular-shaped pin frontwardly until the two said lugs being rearwardly retained by two front end portions of the two rails, and two front stoppers formed on a middle portion of the grounding pin to be frontwardly limited by the front plate of the casing when extending the grounding pin.

3. A universal adapted according to claim 1, wherein said third plug pin of the third plug is rotatably mounted in the third block member so that two third plug pins may be angularly rotated to form two inclined pins adapted to be plugged in a wall sockets having inclined sockets.

4. A universal adapter according to claim 1, wherein said selector switch means includes: the selecting knob formed on the front plate and secured with a spindle rotatably mounted in a lower portion of the casing, the conducting lever secured with the spindle having an upper lever portion selectively contacting a converter-bypassed contactor electrically connected with a conducting wire of the inner conducting means connected to a first clip of a first socket of said output socket means, or contacting a converter-passed contactor connected with an output of the converter which is electrically connected with the municipal power source through the input plug means and two conducting wires of the inner conducting means for stepping down or up an input power voltage for outputing electric power through the converter-passed contactor, and having a lower lever portion connected with an output conducting wire connected to a second clip of the second socket of said output socket means, and two markings formed on the front plate respectively corresponding to the converter-bypassed contactor and the converter-passed contactor for showing "without being converted" and "through converter" respectively.

5. A universal adapter according to claim 4, wherein said selector switch means includes two limiting stoppers formed in said casing disposed on two opposite sides of said conducting lever for limiting a rotating movement of said conducting lever.

* * * * *